United States Patent [19]
Ushikubo et al.

[11] Patent Number: 5,443,105
[45] Date of Patent: Aug. 22, 1995

[54] PNEUMATIC RADIAL TIRE WITH BEAD TOE REINFORCING RUBBER STOCK

[75] Inventors: Hisao Ushikubo, Akron, Ohio; Toru Ubukata, Tokyo, Japan

[73] Assignee: Bridgestone Corporation, Tokyo, Japan

[21] Appl. No.: 206,614

[22] Filed: Mar. 7, 1994

[30] Foreign Application Priority Data

Mar. 17, 1993 [JP] Japan .................... 5-056866

[51] Int. Cl.$^6$ .................... B60C 15/02; B60C 15/024; B60C 15/04; B60C 15/06
[52] U.S. Cl. .................... 152/540; 152/539; 152/543; 152/544; 152/547; 152/DIG. 9
[58] Field of Search ............... 152/539, 540, 544, 516, 152/DIG. 9, DIG. 10, 543, 547, 375, 378, 379.3–379.5, 381.4

[56] References Cited

U.S. PATENT DOCUMENTS

| | | | |
|---|---|---|---|
| 1,981,893 | 11/1934 | Abbott, Jr. | 152/540 |
| 3,951,192 | 4/1976 | Gardner et al. | |
| 4,185,676 | 1/1980 | Raluy | 152/544 |
| 4,260,006 | 4/1981 | Udall et al. | 152/544 |
| 4,269,251 | 5/1981 | Harrington et al. | 152/544 |
| 4,580,610 | 4/1986 | Jackson | 152/539 |
| 4,917,164 | 4/1990 | Ushikubo et al. | 152/544 |
| 4,940,069 | 7/1990 | Nakasaki et al. | 152/544 |
| 5,016,697 | 5/1991 | Noma et al. | 152/544 X |
| 5,044,413 | 9/1991 | Noma et al. | 152/544 |
| 5,186,772 | 2/1993 | Nakasaki et al. | |
| 5,307,853 | 5/1994 | Okuda | 152/540 |

FOREIGN PATENT DOCUMENTS

| | | | |
|---|---|---|---|
| 0314445 | 5/1989 | European Pat. Off. | 152/539 |
| 0376172 | 7/1990 | European Pat. Off. | 152/543 |
| 0434206 | 6/1991 | European Pat. Off. | |
| 1127632 | 12/1956 | France | 152/544 |
| 1327812 | 4/1963 | France | 152/544 |
| 2831698 | 2/1980 | Germany | 152/544 |
| 4215508 | 8/1992 | Japan | 152/539 |
| 1480917 | 7/1977 | United Kingdom | 152/544 |
| 1418073 | 8/1988 | U.S.S.R. | 152/379.3 |

*Primary Examiner*—Adrienne C. Johnstone
*Attorney, Agent, or Firm*—Sughrue, Mion, Zinn, Macpeak & Seas

[57] ABSTRACT

The pneumatic radial tire of the invention has a pair of bead portions each containing a bead core therein and is characterized in that each bead core is substantially constructed by winding at least one metal wire, and a bead toe reinforcing rubber stock with a JIS A hardness of 80°–98° is arranged inward of the outer edge of each bead core in an axial direction of the tire. In each bead portion the width of the bead toe reinforcing rubber stock is in a range of 0.5–2.0 times the width of the bead core in the axial direction. In each bead portion the width from the outer edge of the bead core to the inner edge of the bead portion in the axial direction of the tire is in a range of 1.1–3.0 times the width of the bead core in the axial direction of the tire. In each bead portion the side region in the axial direction of the tire and the inner region in the radial direction of the tire around the bead core and the bead toe reinforcing rubber stock are substantially reinforced by a chafer made of organic fiber cords.

4 Claims, 4 Drawing Sheets

PNEUMATIC RADIAL TIRE WITH BEAD TOE REINFORCING RUBBER STOCK

BACKGROUND OF THE INVENTION

1. Field of the Invention

This invention relates to a pneumatic radial tire, more particularly to a pneumatic radial tire which can improve cornering performance at high speed running and riding comfortability as well.

2. Description of the Prior Art

Recently, improvement of road networks, high power of cars and enhancement of performance have tended to increase car speed more and more. While the running performance at a high speed on straight roads and highways is as a matter of course satisfactory, the cornering performance is on the other hand a problem in such cars. That is, there is a need for performance which guarantees cornering at a high speed with safety. In general, as a measure for improvement of cornering performance, strengthening the rigidity of the region around bead base portions by providing reinforcing layers extending from this region to an area in a sidewall portion having maximum width has been suggested.

By adopting such reinforcing layers, though the rigidity apparently increases, on the contrary disadvantages caused by weight, cost and further deterioration of the riding comfortability were found upon actual running of the car.

Having regard to the above, it is an object of this invention to provide a pneumatic radial tire which has improved riding comfortability and cornering performance without increasing the weight of the tire.

SUMMARY OF THE INVENTION

The present invention provides a pneumatic radial tire, comprising: a tread portion, a pair of bead portions each containing a bead core therein, at least one carcass layer comprising organic fiber cords arranged substantially at an angle of 90° with respect to a circumferential direction of the tire, and a belt layer comprising two plies of cords, the cords of one ply and the cords of the other ply crossing each other and being inclined at a relatively small angle with respect to the circumferential direction of the tire, which belt layer is arranged in a crown region of the tire and radially outward of the at least one carcass layer; characterized in that each bead core is substantially constructed by winding at least one metal wire, and a bead toe reinforcing rubber stock with a JIS A hardness of 80°–98° is arranged inward of the outer edge of each bead core in an axial direction of the tire, in each bead portion the width of the bead toe reinforcing rubber stock is in a range of 0.5–2.0 times the width of the bead core in the axial direction, and in each bead portion the width from the outer edge of the bead core to the inner edge of the bead portion in the axial direction of the tire is in a range of 1.1–3.0 times the width of the bead core in the axial direction of the tire, and in each bead portion the side region in the axial direction of the tire and the inner region in the radial direction of the tire around the bead core and the bead toe reinforcing rubber stock are reinforced by a chafer made of organic fiber cords.

According to one preferred embodiment of each invention, the shape of the bead core is substantially circular in cross section.

According to another preferred embodiment of the invention, the shape of each bead core is substantially square in cross section.

A bead protector filling up a gap between a rim flange of a normal rim when the radial tire is mounted thereon and a bead portion is preferably arranged in each bead portion.

According to the pneumatic radial tire of this invention, because the bead core is constructed by winding at least one metal wire, it has a low rigidity and can support the load uniformly as compared with a conventional bead core. Therefore, excellent rim fitness, which provides uniformity upon assembly, can be obtained. Therefore, deformations at a limited part caused by large deformations when cornering is prevented. Thus, the cornering performance can be improved by decreasing change of the contact shape (especially contact pressure etc.), which is obtained by above less deformations enabling large areas of the tire to support the load, when cornering. Further, the shape of the bead core can be substantially circular or square in cross section.

Further, because a bead toe reinforcing rubber stock with a JIS hardness of 80°–98° is arranged in the inner region of the bead portion in an axial direction of the tire, and a chafer made of organic fiber cords is arranged at the side region in the axial direction and the inner region in the radial direction of the tire of the bead core and the bead toe reinforcing rubber stock, collapse of the bead portion is decreased drastically, and the cornering performance can be improved further in addition to the improving effect for the cornering performance achieved by the bead core. These mutual effects improve the cornering performance at a high speed. In the pneumatic radial tire of the present invention, only the rubber in the bead portion is hardened, so the weight of the tire does not increase.

If the bead toe reinforcing rubber stock has a hardness less than 80°, the bead base portion tends to move under large deformations of the bead portion. This results in slipping off of the rim in the worst case. Also, if the bead toe reinforcing rubber has a hardness greater than 98°, the rigidity of the bead portion increases considerably. This is not preferable because it results in, for example, breaking off of the bead toe and worsening of the fitness.

If the width of the bead toe reinforcing rubber stock in the axial direction of the tire is less than 0.5 times that of the bead core in the axial direction of the tire, this results in slipping off the bead and loss of control of the movement of the bead portion. If the width is greater than 2.0 times, this results in deteriorating of the rim mounting and fitness.

Moreover, if the width from the outer edge of the bead core to the inner edge of the bead portion in the axial direction of the tire is less than 1.1 times that of the bead core in the axial direction of the tire, this results in a problem of slipping off of the rim caused by loss of control of the movement of the bead portion under large deformations of the bead portion, and if the width is greater than 3.0 times, this results in deterioration of rim mounting and fitness.

By arranging a bead protector at each bead portion filling up a gap between a rim flange of a normal rim when the radial tire is mounted thereon and the bead portion, collapse of the bead portion in the axially outer direction can be restrained further.

DESCRIPTION OF THE PREFERRED EMBODIMENTS

Figure 1:
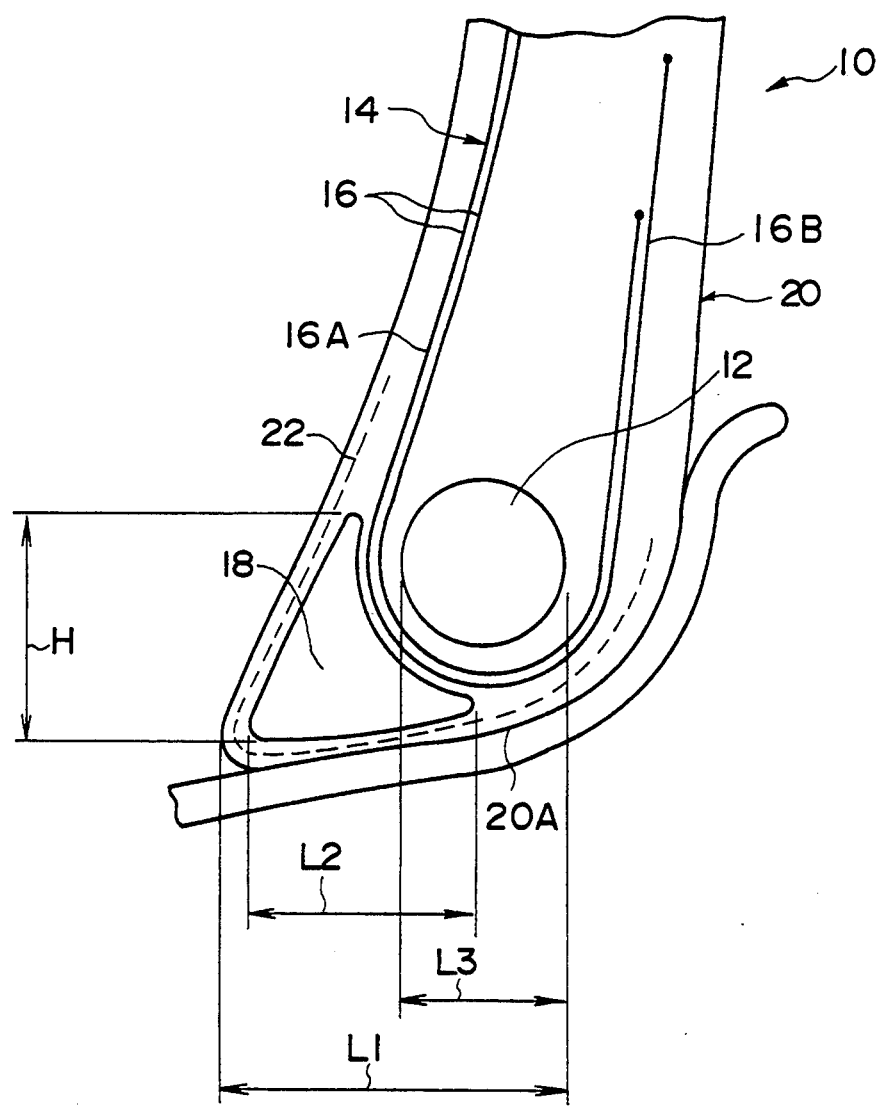
FIG. 1 is a cross section of a principal part of a bead portion of one embodiment of a tire of the present invention.

In the drawings, like reference numerals indicate like parts.

The present invention will be first explained with reference to FIG. 1.

As is described in FIG. 1, a pneumatic radial tire 10 of this embodiment comprises a pair of bead cores 12 and a toroidal carcass layer 14. The carcass layer 14 has at least one carcass ply 16 containing a number of cords extending in the radial direction therein. Two carcass plies 16 are shown in this embodiment.

In this embodiment, carcass plies 16 having organic fiber cords obliquely extending at an angle of 80° with respect to the circumferential direction of the tire are such that the cords of one ply and the cords of the other ply cross with respect to each other. The angle of 80° is to be considered within the scope of the invention, which requires that the cords of the carcass layer are arranged substantially at an angle of 90° with respect to the circumferential direction of the tire. The organic cords of the at least one carcass ply 16 may extend at an angle of 90° with respect to the circumferential direction of the tire.

The at least one ply 16 comprises a main portion 16A positioned at the inner side of the bead core 12 in the axial direction of the tire, and a turn-up portion 16B turned up around the bead core 12 and positioned at the outer side of the bead core 12 in the axial direction of the tire. The at least one ply extends from one bead core 12 to the other bead core 12.

Though, for the bead core 12, a cable bead with a circular cross section obtained by winding one wire (diameter 1.0 mm) around the core wire spirally and a mono strand bead with a square cross section (refer to FIG. 2) by piling up one wire wound from the inner side in order are preferable, the cross section is not restricted to these two shapes.

A bead core 12 of this embodiment is a cable bead constructed by winding one wire around the core wire (diameter 1.0 ram). The width L3 of the bead core 12 in the axial direction of the tire is 8 min.

A belt layer (not shown in the drawing) which comprises belt plies having a number of cords, the cords in adjacent plies crossing each other and obliquely extending with respect to the circumferential direction of the tire therein, is arranged radially outside of the carcass layer 14. A belt reinforcing layer (not shown in the drawing) is arranged adjacent to and outside of the belt layer in the radial direction and the side region in the width direction of the tire. Further a tread (not shown in the drawing) is arranged radially outward of the belt layer and belt reinforcing layer.

A bead toe reinforcing rubber stock 18 is arranged axially inward of the outer edge of the bead core 12 across the carcass plies 16. The bead toe reinforcing rubber stock 18 whose surface faces the axially inner side of the bead portion 20, the tire rim and the carcass plies 16 has an approximate triangular shape in cross section. The hardness of the bead toe reinforcing rubber stock 18 is 80°–98°, preferably 85°–97°. The hardness of the bead toe reinforcing rubber stock 18 of this embodiment is 95°.

The width L2 in the axial direction of the bead toe reinforcing rubber stock 18 is in a range of 0.5–2.0 times of that of the bead core 12 in the axial direction of the tire, and is preferably 0.5–1.5 times.

The height H in the radial direction of the tire of the bead toe reinforcing rubber stock 18 is 10 mm in this embodiment.

The width L1 from the outer edge of the bead core to the inner edge of the bead portion in the axial direction of the tire is preferably in a range of 1.1–3.0 times the width L3 of the bead core in the axial direction of the tire. The width L1 is 1.7 times L3 in this embodiment.

A canvas chafer 22 is arranged substantially along the side region in the axial direction of the tire and the inner region in the radial direction of the tire around the bead core 12 and the bead toe reinforcing rubber stock 18. In order to form the canvas chafer 22, the bead toe reinforcing rubber stock 18 should be preferably pre-set on the canvas chafer 22, and be formed together.

The function of this embodiment is explained below. According to the pneumatic radial tire 10 of this embodiment, because the bead core 12 constructed by winding at least one metal wire is a round shape bead core whose cross section is a circular shape, it has a low rigidity (the tensile strength is the same) and can uniformly support a load. Therefore, deformations at a limited part caused by large deformations when cornering are prevented. Thus, the cornering performance can be improved by decreasing a change of the contact shape (especially contact pressure etc.), which is obtained by the above less deformations enabling the large area of the tire to support the load, when cornering.

Further, because a bead toe reinforcing rubber layer 18 with high hardness is arranged axially inward of the outer edge of the bead core 12 across the at least one carcass ply 16 and a canvas chafer 22 is also provided, collapse of the bead portion 20 is decreased drastically when cornering at a high speed. Thus the cornering performance can be improved in addition to the improving effect for the cornering performance achieved by the bead core 12. In the pneumatic radial tire of this embodiment, only the rubber in the bead portion 20 is hardened, so the weight of the tire does not increase.

If the bead toe reinforcing rubber stock 18 has a hardness less than 80°, the bead base portion 20A tends to move under the large deformations of the bead portion 20. This results in slipping off of the rim in the worst case. Also, if the bead toe reinforcing rubber stock 18 has a hardness greater than 98°, the rigidity of the bead portion 20 increases considerably. This is not preferable because it results in, for example, breaking off of the bead toe and worsening of the fitness.

If the width L2 of the bead toe reinforcing rubber stock 18 in the axial direction of the tire is less than 0.5 times the width L3 of the bead core 12 in the axial direction of the tire, this results in slipping off the bead and loss of control of the movement of the bead portion 20, and if the width is greater than 2.0 times, this results in deteriorating of the rim mounting and fitness.

Moreover, if the width L1 from the outer edge of the bead core 12 to the inner edge of the bead portion 20 in the axial direction of the tire is less than 1.1 times the width L3 of the bead core 20 in the axial direction of the tire, this results in a problem of slipping off of the rim caused by loss of control of the movement of the bead portion 20 under the large deformations of the bead portion. If the width is greater than 3.0 times, this results in deterioration of rim mounting and fitness.

The following experiment to determine riding comfortability and cornering performance was carried out for the pneumatic radial tire of this embodiment, a conventional pneumatic radial tire and a comparison pneumatic radial tire fitted to a car.

In the conventional pneumatic radial tire, the bead core was a strand bead core having a square shape and two reinforcing layers, and it was not provided with the bead toe reinforcing rubber layer. In the comparison pneumatic radial tire, though the bead core was the same as this invention, it was not provided with the bead toe reinforcing rubber layer either.

The experiment in respect of the riding comfortability was done by evaluating running feeling over a test course of 6 km, and that in respect of the cornering performance was done by evaluating the lap time over the same course. The results are shown in Table 1 below by using an index of 100 for the conventional pneumatic radial tire. In the Table, the higher the value, the better the performance.

TABLE 1

|  | Conventional tire | Comparison tire | Embodiment tire |
|---|---|---|---|
| Riding comfortability | 100 | 110 | 110 |
| Cornering performance | 100 | 105 | 115 |

According to the test result shown in the Table 1, the pneumatic radial tire of this invention shows excellent riding comfortability and cornering performance as compared to the conventional tire and the comparison tire.

Figure 2:
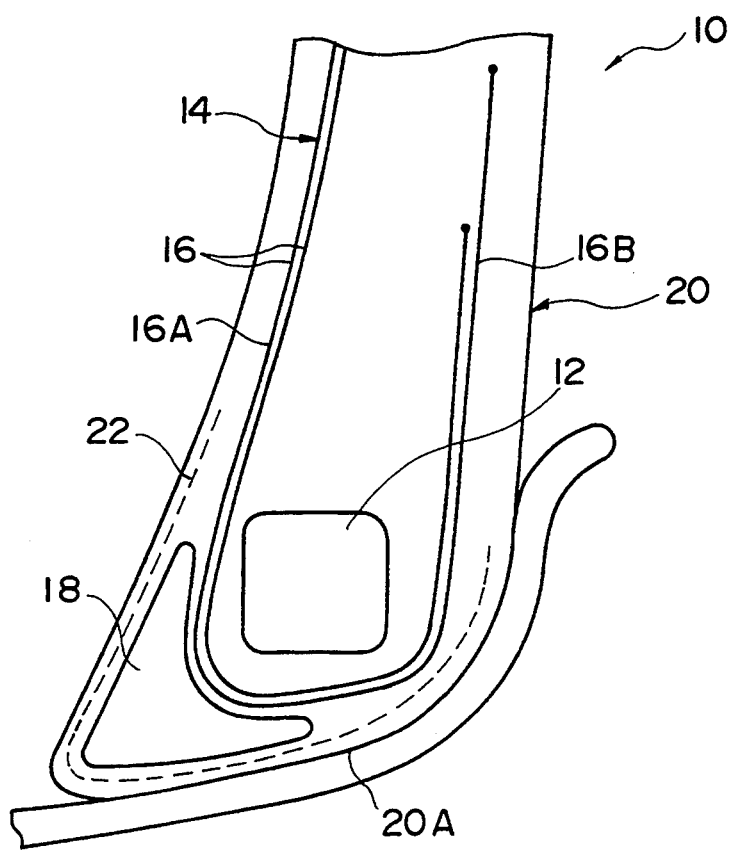
FIG. 2 is a cross section of a principal part of a bead portion of a second embodiment of the tire of the present invention.

FIG. 2 shows a second embodiment which is substantially the same at that of FIG. 1, except that the bead core 12 is a mono strand bead with a square cross-section obtaining by piling up one wire wound from the inner side in order.

Figure 3:
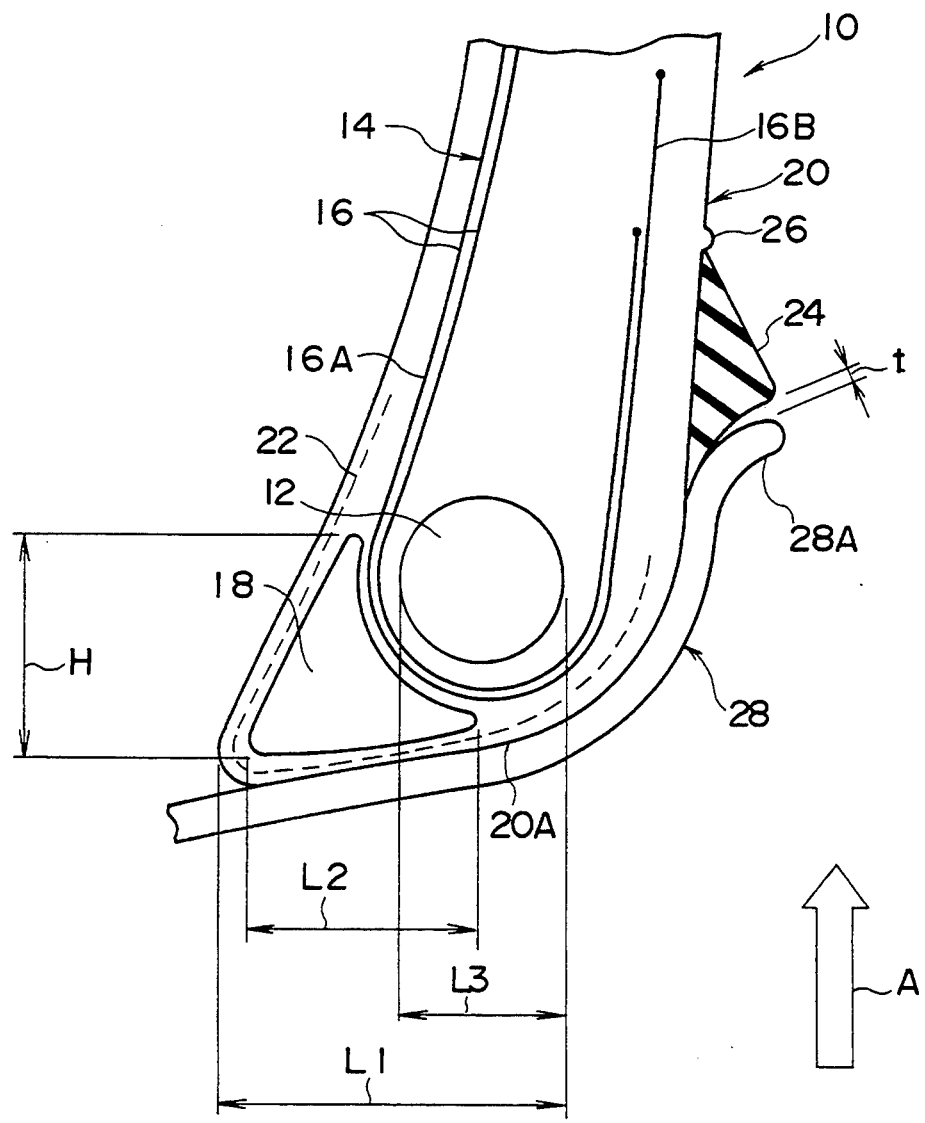
FIG. 3 is a cross section of a principal part of a bead portion of a third embodiment of a tire of the present invention, having a bead protector.

As shown in FIG. 3, a third embodiment a bead protector 24 may be arranged in the bead portion 20 of the pneumatic radial tire 10.

The bead protector 24 has an approximately triangular shape in cross section to fill up a gap with the same shape formed between the rim flange end 28A and the bead 20 when the pneumatic radial tire 10 is fitted to the rim 28. The gap t between the bead protector 24 and the rim flange 28A is preferably 0 mm (adhered condition)—5 mm. The shape of the bead protector 24 facing the rim flange 28A preferably has a smooth curvature along the rim flange 28A.

The bead protector 24 can be formed by mounting a long rubber to a certain location of the bead portion 20 when forming a green tire.

The hardness of the rubber of the bead protector 24 after vulcanization is preferably higher than that of the bead portion 20.

A circular rim line 26 made of projected rubber of the bead portion 20 is preferably formed at the outer edge of the bead protector 24 and the outer side of the tire in the radial direction of the tire (direction of an arrow A). In order to form the rim line 26, the mold needs to have a reverse U shape of that of the rim line 26 inside the surface. The U shape of the mold enables air inside the mold to escape from the inside, and an air spot can be eliminated smoothly. This makes the rubber flow smoothly inside the mold and prevent generation of uneven portions. The rim line 26 may comprise two lines, if necessary.

In the pneumatic radial tire 10 having the bead protector 24, since a gap having a triangular shape can be substantially filled by the bead protector 24, collapse of the bead portion 20 can be decreased. This brings about a further improvement of the cornering performance of a car. The gap having a triangular shape between the bead portion 20 and the rim flange 28A is actually so small that the weight of the rubber used for the bead protector 24 can be practically ignored.

Figure 4:
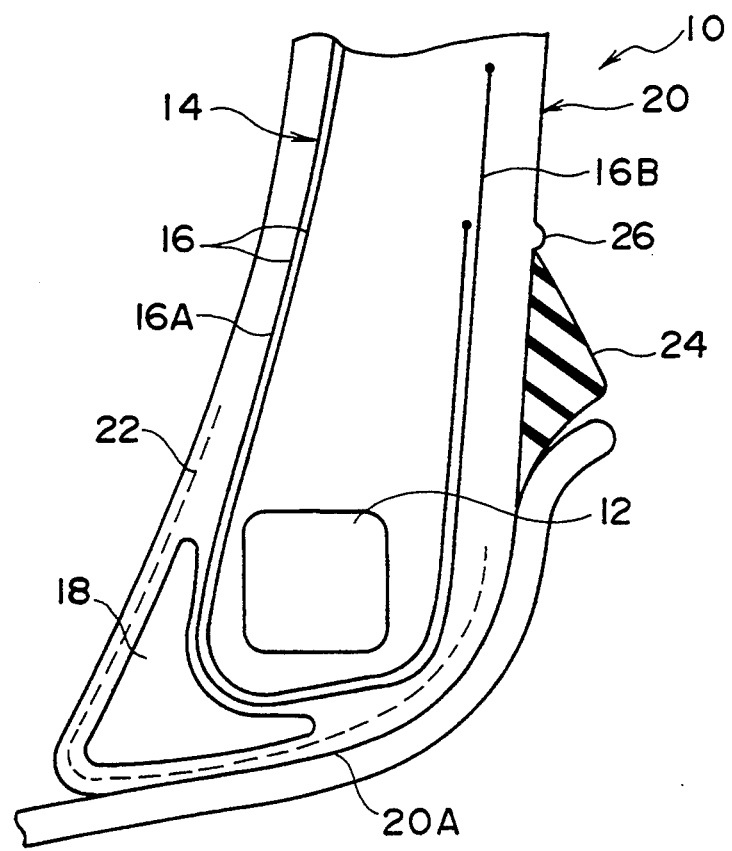
FIG. 4 is a cross section of a principal part of a bead portion of a fourth embodiment of a tire of the present invention, having a bead protector.

The bead protector may be used not only for the pneumatic radial tire 10 having a bead core of round shape, but also a bead core having other shape of cross section, for example a bead core 12 having a square cross section as shown in FIG. 4 (mono strand bead with a square cross section by piling up one wire wound from inner side in order).

As can be seen from above explanation, the pneumatic radial tire according to the present invention has excellent riding comfortability and cornering performance without increase of the weight of the tire.

While the invention has been particularly shown and described with reference to certain preferred embodiments thereof, it will be understood by those skilled in the art that various changes and modifications may be made without departing from the spirit and scope of the invention.

We claim:

1. A pneumatic radial tire, comprising: a tread portion; a pair of bead portions each containing a bead core therein; at least one carcass ply of organic fiber cords arranged substantially at an angle of 90° with respect to a circumferential direction of the tire; and a belt layer comprising two plies of cords, the cords of one ply and the cords of the other ply crossing each other and being inclined at a relatively small angle with respect to the circumferential direction of the tire, which belt layer is arranged in a crown region of the tire and radially outward of the at least one carcass ply; wherein each bead core is substantially constructed by winding at least one metal wire; and a bead toe reinforcing rubber stock with a JIS A hardness of 85°-97° arranged inward of the outer edge of each bead core in an axial direction of the tire, in each bead portion the width of the bead toe reinforcing rubber stock being in a range of 0.5-2.0 times the width of the bead core in the axial direction, and in each bead portion the width from the outer edge of the bead core to the inner edge of the bead portion in the axial direction of the tire being in a range of 1.1-3.0 times said width of the bead core in the axial direction of the tire; and a chafer in each bead portion made of organic fiber cords reinforcing the side region in the axial direction of the tire and the inner region in the radial direction of the tire around the bead cord and the bead toe reinforcing rubber stock, said bead toe reinforcing rubber stock in each bead portion having an approximately triangular shape in cross section with faces opposite to an inner side of said bead portion in the axial direction of the tire, said at least one carcass ply, and a bead base portion of said radial tire.

2. The pneumatic radial tire according to claim 1, wherein the shape of each bead core is substantially circular in cross section.

3. The pneumatic radial tire according to claim 1, wherein the shape of the bead core is substantially square in cross section.

4. The pneumatic radial tire according to claim 1, further comprising a bead protector provided in each bead portion and filling a gap between a rim flange end of a normal rim when said radial tire is mounted thereon and a bead portion.

* * * * *